United States Patent [19]
Bruckert et al.

[11] Patent Number: 5,227,775
[45] Date of Patent: Jul. 13, 1993

[54] METHOD AND ARRANGEMENT FOR CHANNEL MONITOR AND CONTROL

[75] Inventors: Eugene J. Bruckert, Arlington Heights; James R. Engel, Sleepy Hollow, both of Ill.

[73] Assignee: Motorola Inc., Schaumburg, Ill.

[21] Appl. No.: 859,231

[22] Filed: Mar. 26, 1992

Related U.S. Application Data

[63] Continuation of Ser. No. 191,530, May 9, 1988, abandoned.

[51] Int. Cl.$^5$ ............................................... H04Q 1/00
[52] U.S. Cl. ................................. 340/825.25; 340/825.5
[58] Field of Search ........... 340/825.5, 825.52, 825.53, 340/825.51, 825.54; 370/95.1, 85.2, 82-84, 79

[56] References Cited

U.S. PATENT DOCUMENTS

| | | |
|---|---|---|
| 4,013,959 | 3/1977 | Patterson . |
| 4,332,027 | 5/1982 | Malcolm et al. . |
| 4,476,467 | 10/1984 | Terwilliger et al. . |
| 4,517,669 | 5/1985 | Freeburg et al. . |
| 4,519,068 | 5/1985 | Krebs et al. . |
| 4,564,838 | 1/1986 | Boulogne et al. . |
| 4,646,082 | 2/1987 | Engel et al. . |
| 4,688,035 | 8/1987 | Gray et al. ............... 340/825.52 |

OTHER PUBLICATIONS

A. Tanenbaum, "Computer Networks", Prentice-Hall, N.J., 1981, pp. 270-307.

*Primary Examiner*—Ulysses Weldon
*Attorney, Agent, or Firm*—Donald B. Southard

[57] ABSTRACT

A method and means for controlling transmissions among a plurality of communication units is described that determines an inhibit state based upon an inhibit signal and information in a header preceding a coded message before allowing transmission. This inhibit state prevents all of the other remote units from transmitting while a prescribed remote unit transmits a coded message or an acknowledgment (ACK) so that collisions between messages and ACKs, or between one ACK and another, are avoided. Message-message collisions are substantially reduced since the method causes a remote unit to utilize a random delay before attempting a retry to send the message a second time. Hence, the method and arrangement better coordinates inbound transmissions to the base station so that collisions on the inbound channel to the base station are minimized.

33 Claims, 4 Drawing Sheets

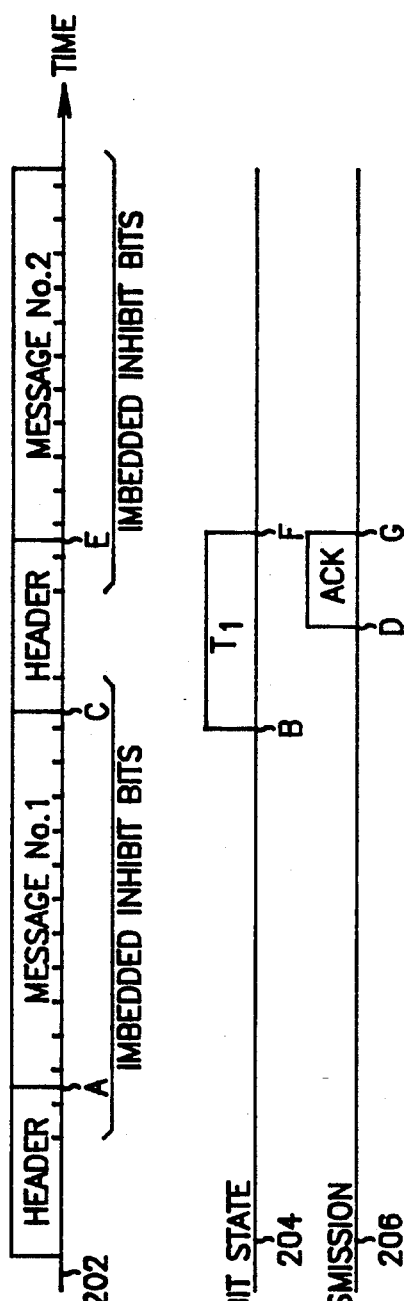

METHOD AND ARRANGEMENT FOR CHANNEL MONITOR AND CONTROL

This is a continuation of application Ser. No. 07/191,530, filed May 9, 1988 and now abandoned.

BACKGROUND OF THE INVENTION

This invention relates to the field of radio transport of alphanumeric messages to and from remote units and at least one base station, and specifically to a method and means for coordinating inbound transmissions to the base station wherein collisions between coded messages and acknowledgments on an inbound channel to the base station are minimized. The present application is related to the instant assignee's U.S. Pat. No. 4,646,082 issued Feb. 24, 1987, entitled "Inbound Acknowledgment Stack" and invented by James R. Engel, et al.

Portable Data terminal systems have been developed for providing data message communications over a conventional radio frequency (RF) link in order to couple remote units, or terminals, to at least one base station, and ultimately to a host computer, to provide operational command and control for a public service agency or the like. Such RF communication systems typically operate on two channels, namely, an inbound channel and an outbound channel to the base station. Thus, although the remote units typically operate in half-duplex mode by transmitting on the inbound channel to the base station and receiving on the outbound channel, the base station transmits on its outbound channel and receives on its inbound channel by utilizing a full-duplex mode.

The operation of this type of system is sequenced and controlled from the fixed end by a "system controller". This system controller organizes and generates the various outbound transmissions which generally include at least a header and a coded message as a single packet of information over the operating channel of the system. Each remote unit that receives an outbound transmission from the base station is generally required to send an acknowledgment (ACK). This acknowledgement may be a positive or affirmative type, which indicates the message has been received and will be acted upon, or a negative acknowledgement indicating at least the address or header was received by not the message. Or, alternatively, it may indicate both header and message were received but that the addressee rejects or is unable to respond to the particular message at this time. In either case, it will means that the same is not or cannot be properly decoded at this time. The base station will repeat its message to the various remote units until an ACK of whatever type has been received.

One known improvement utilizes an imbedded inhibit signal in the outbound transmission to prevent other remote units from beginning a possibly interfering transmission when one is in progress. A second known improvement is the Inbound Acknowledgment Stack which is effective in preventing the simultaneous transmission of acknowledgment signals after a period of a relatively long inhibit. In implementing such a method and arrangement, several difficulties are introduced which increase the likelihood that collisions will occur in such a contention RF communications system.

The first problem is that when two or more remote units are transmitting simultaneously at least one, and often both, inbound transmissions are lost.

A second type of difficulty with the prior art system is the inordinately long delay encountered before transmitting an inbound message when the status of the outbound channel is unknown.

A third type of difficulty occurs while waiting for frame sync, namely, bunching of messages which causes an increase in collisions, both of the message-message type and of the message-ACK type.

SUMMARY OF THE INVENTION

Accordingly, it is an object of the present invention to provide a method and means, or preventing mutual interference for collisions, among inbound transmissions of any type, whether, message to message, or message to acknowledgment.

It is yet another object of the present invention to provide a method and means to improve system reliability by insuring that a prescribed remote unit transmits its ACK in a unique time slot and that other remote units are prevented from transmitting their coded messages preceded by a header in the ACK unique time slots, so that message-ACK collisions are virtually eliminated and message-message collisions are significantly reduced by eliminating message queue build-up during the wait for frame sync.

Briefly described, the present invention contemplates a method and means which are activated whenever a remote unit operator attempts to send an inbound transmission by hitting his push-to-talk (PTT) switch, or whenever the base station transmitter is transmitting. Each remote unit makes a sequence of decisions, including whether there is a delay, whether the base-station transmitter is transmitting, and determining an inhibit state based upon an imbedded inhibit signal and information in the header to a coded message before transmitting on the inbound channel to the base station. This inhibit state prevents all of the other communication units from transmitting while a prescribed communication unit or remote unit transmits a message or an acknowledgment (ACK) so that collisions between messages and ACKs or between one ACK and another ACK are avoided. Message-message collisions are likewise substantially reduced since the method causes a remote unit to utilize a random delay before attempting a retry to send the message a second time.

BRIEF DESCRIPTION OF THE DRAWINGS

FIG. 2A is a timing diagram showing an outbound transmission that includes two messages, each preceded by a header.

FIG. 2B is a timing diagram showing the relationship between transmitted messages, inhibit state, and a subsequent acknowledgment (ACK).

FIG. 2C is a timing diagram showing the relationship between transmitted messages, inhibit state, and a subsequent ACK 1 following the end of an inbound message as related back to the timing diagram of FIG. 2A.

FIG. 3 is another timing diagram showing the relationship between transmitted messages, inhibit state, and a plurality of subsequent ACKs.

DETAILED DESCRIPTION OF THE PREFERRED EMBODIMENT

Figure 1:
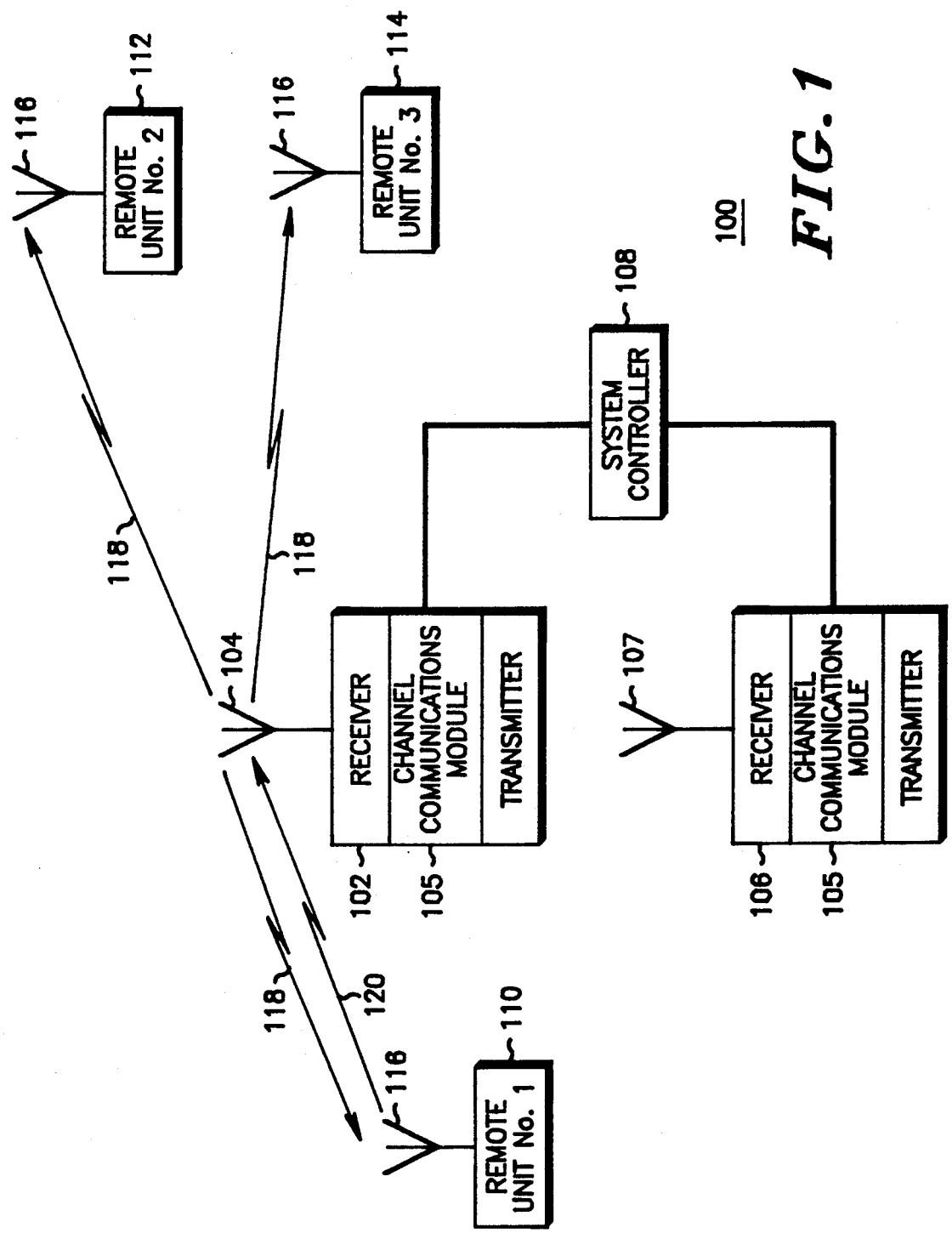
FIG. 1 is a block diagram of an RF communication system for exchanging data in the form of coded messages that may advantageously utilize the present invention.

Referring now to FIG. 1, there is shown a block diagram of an RF communication system of the type which may advantageously utilize the present invention. This type of system includes a plurality of communication units and transmits alphanumeric data in the form of coded messages between a primary station, such as a base station (102) through an antenna (104) and via a communications medium, such as an RF channel.

A second base station (106) may be included in the system which couples to an antenna (107), to provide redundancy for improved reliability when co-located with the base station (102), or it may be located away from the base station (102) in order to expand the coverage area to a larger geographical area.

System controller (108) may be part of the base station or may be utilized separately to coordinate the operation between base station (102) and optional base station (106). The plurality of communication units comprise a plurality of remote units (110, 112, and 114), each of which utilizes a small antenna (116) incorporated therein to communicate with the base station (102) as shown. During any given instant in time, the base station (102) sends an outbound transmission, represented by the numeral 118 and receives a single inbound transmission, represented by the numeral 120.

Base station (102) includes at least a receiver, a channel communications module (CCM), and a transmitter (105). Such equipment already exists and is available as Motorola Model MSF-5000 base station which includes a CCM having a Motorola Model GCC-480 therein. For systems having more than one base station, the system controller (108) is available as a Motorola Models NCP-500 or NCP-3000.

Remote units (110, 112, and 114) are available from Motorola in a variety of models, including Models KDT-440, KDT-460 and KDT-840. These and the aforementioned Motorola models and corresponding instruction manuals may be obtained from Motorola C & E Parts, 1303 East Algonquin Road, Schaumburg, Ill. 60196. Many of the above elements are described in U.S Pat. No. 4,646,082 to Engel, et al., issued Feb. 24, 1987 and assigned to the assignee of the present application. The material described in the above U.S. patent is incorporated herein by reference.

Although the above system has been described in terms of the arrangement depicted in FIG. 1, the system may optionally be configured according to that shown in FIG. 2 of issued U.S. Pat. No. 4,646,082, and this configuration is also incorporated herein by reference.

According to an important feature of the present RF communication system, whether in the context of a data only system or both data and analog signals together, each of the remote units receives an outbound transmission from the base station and replies with an acknowledgment (ACK) or a coded message on an inbound transmission that includes a header and a coded message. The various combinations and situations of signals occurring over time can best be seen by turning to the various timelines given in FIG. 2.

Referring now to FIG. 2A, an outbound transmission is depicted along a timeline (202) that has a sequence of two messages, each preceded by a header. Note that within the header and coded message #1 (MES. 1) there exists a periodically recurring, imbedded inhibit signal within the bracket labelled imbedded inhibit bits. These "tick" marks represent approximate time occurrences of these bits, whether they are digital ones (1) or zeroes (0).

The inhibit state bits (ISBs) are imbedded in the coded message following the header and may be imbedded in part or in all of the header. The preferred embodiment utilizes an input data buffer (not a specifically shown) in which all of the incoming bits are serially entered in ascending order into a (7×16) matrix to the extent of the variable duration of a given coded message:

$$
\begin{array}{llll}
b_1, — & b_2, & \ldots & B_{15}, b_{16} \\
b_{17}, & b_{18}, & \ldots & b_{31}, B_{32} \\
 & & \ldots & B_{47}, b_{48} \\
 & & \ldots & b_{63}, B_{64} \\
 & & \ldots & B_{79}, b_{80} \\
 & & \ldots & b_{95}, B_{96} \\
b_{97}, & b_{98} & & B_{111}, b_{112}
\end{array}
$$

Those bits identified by capital letters, and underlined, above, are reserved for the ISBs, of which the three latest received ISBs are utilized in the preferred embodiment of the present invention. It is to be noted that (1)s indicate inbound channel activity, all (0)s indicate inbound channel inactivity, and any mixture of (1)s and (0)s indicate an indefinite state of activity. Other arrangements, of course, could be utilized.

Two pointers are utilized within the above matrix, namely the input data buffer pointer to locate where the next data byte is to be stored, and the ISB pointer that points to the last of the latest three ISBs.

Next, FIG. 2B shows an inhibit state represented by block $T_1$ along a timeline (204). As will be noted subsequently this inhibit state is based upon the imbedded inhibit signal and information in the header within a given outbound transmission, such as depicted in FIG. 2A, above. During this inhibit state, $T_1$, all of the plurality of remote units, except for the one acknowledging the message #1, are inhibited, while the prescribed remote unit #1 to whom the message is addressed acknowledges the receipt of that message as shown by the inbound transmission block labelled ACK depicted on the timeline (206). This acknowledgement may be either positive or negative as previously referenced.

Thus, it should be evident that remote unit #1 is sending an acknowledgment back to the base station upon receipt of header and message #1 from the base station in the absence of any inbound transmission currently in process to the base station. Moreover, information is included in the accounted header to indicate the length of message #1 to all of the remote units in order that a block of time greater than the duration of the anticipated ACK can be reserved as early as the point in time represented by reference letter B. It will be noted in the drawings of FIG. 2A and 2B that Point B is shown as, and is intended to convey the information that, it is prior in time to the illustrated Point C. Moreover, Point G is essentially at or slightly prior in time to Point F.

Next, FIG. 2C depicts a different situation in which the inhibit state is extended and begins earlier in time, as represented by reference letter H on the inhibit state timeline (208). As such, this inhibit state remains on past the point labelled with reference letter D through time interval $T_1'$ and ending at the point labelled with reference letter M. This extended inhibit state occurs for the situation where an inbound message is detected by the base station and the imbedded inhibit signal in the outbound transmission, in turn, alerts the remote units so as not to transmit until the conclusion of this inbound message, and further to allow for the anticipated (positive or negative) acknowledgement ACK 1 shown on the inbound transmission timeline (210). In each of the above situations, namely that depicted in FIG. 2C and FIG. 2B, like reference letters are utilized for like points in time corresponding back to the outbound transmission timeline (202) depicted in FIG. 2A.

Yet another situation is depicted in FIG. 3 in which a sequence of many messages are sent sequentially in an outbound transmission, as depicted on timeline (302). Furthermore, given that an inbound message exists, the inhibit state will have been activated ON, as shown on timeline (304) and will also include an additional time period $T_2$ that ends at the point labelled with reference letter R. For this situation, the inbound transmissions received by the base station will include an inbound message ending at the point labelled with reference letter J followed by an inhibit release delay time extending to the point labelled with reference letter D, after which the plurality of ACKs anticipated to be sent as a result of the multitude of messages 1−N, will be sent in a sequence such as is shown for ACK2 followed by ACK1 which ends before the point in time labelled R.

Thus, this situation depicts a stack interval that is created at the end of the inbound transmission to the base station so that a time slot is reserved for an ACK from the second remote unit and an adjacent time slot is reserved for an ACK from the first remote unit without collisions.

Figure 4:
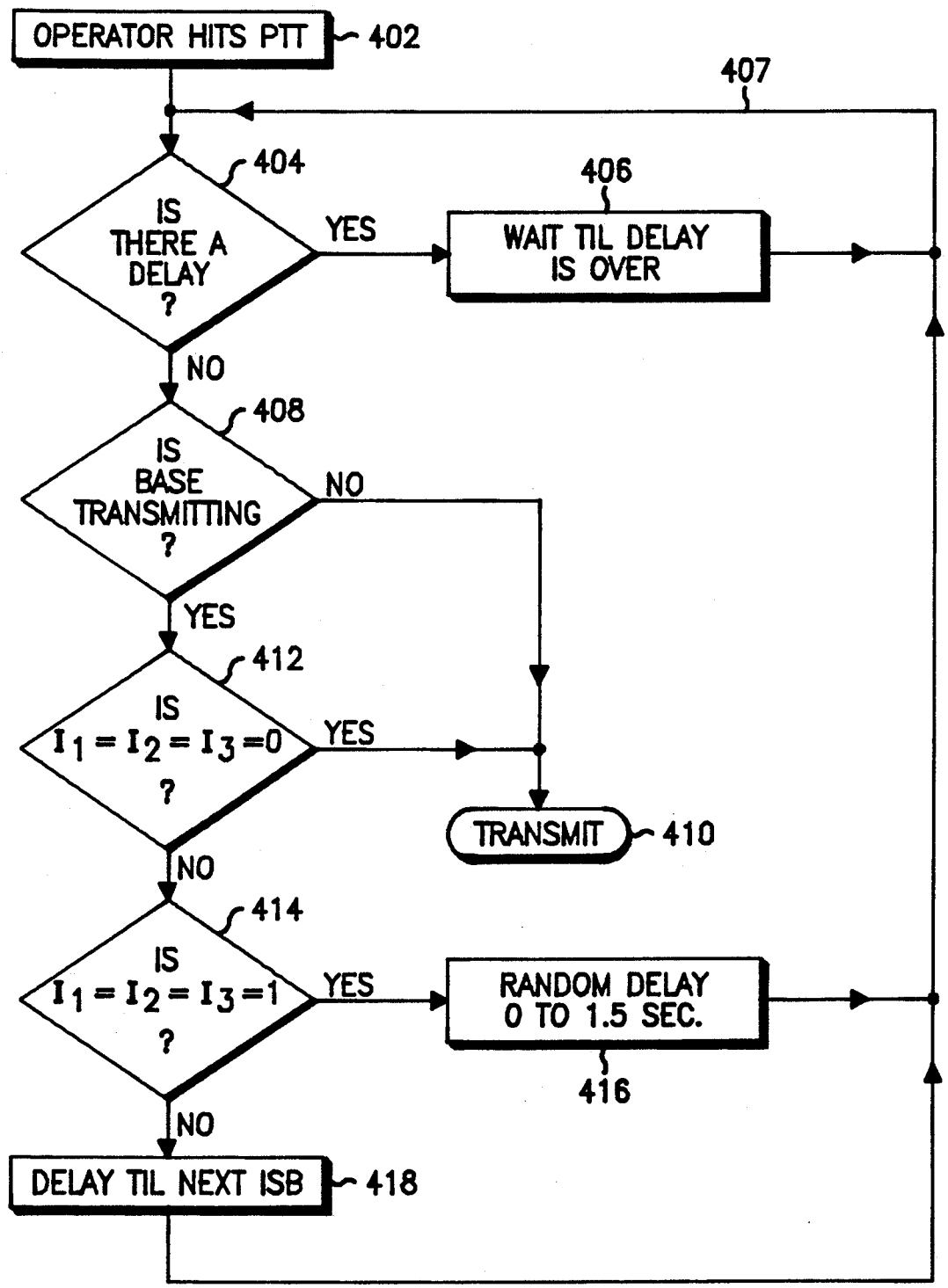
FIG. 4 is a flow diagram detailing the operation of the method of the present invention.

Turning next to FIG. 4, a flowchart is shown of the decisions required to be made within the remote unit to enable transmission. Beginning at block (402), the remote unit operator wishes to transmit a (inbound) message and hits his PTT switch, which in turn initiates a decision as depicted in block (404), namely, the step of checking whether an initial delay has been set to prohibit transmission for a prescribed delay duration. Such prescribed delay may be due to a random delay or various other delays, as will be referenced subsequently.

If there is a delay, the method proceeds to wait until this delay is over, as represented in block (406). When this delay is over, the method proceeds to check again whether there are any new delays since the last time it checked, as represented by the return path (407).

If there are no further delays encountered in block (404), the method proceeds to check whether the base station is transmitting as represented in block (408). If the base station is not transmitting, then the method assumes that there are no current inbound transmissions and therefore authorizes this prescribed remote unit to be allowed to transmit immediately and without further delay, as represented by block (410).

If, however, the base station is transmitting, as determined in block (408), the method next determines an inhibit state based upon the inhibit signal or inhibit state bits, as represented in block (412). In making this determination, the method determines the inhibit state by looking at the latest three inhibit state bits to determine if they are all equal to zero. If this is so, then the method allows this prescribed remote unit to transmit, immediately, as represented at block (410).

If the inhibit state bits are not all logical 0, as determined in block (412), then the method next checks these inhibit state bits to determine if they are all equal to a logical 1, as represented in block (414). If the determination is YES, the method proceeds to abide by a random delay which may be of a prescribed duration anywhere between 0 and 1.5 seconds, as represented in block (416). Upon completing this delay, the method begins again at the starting point as represented by return line (407).

If, however, the determination in decision block (414) was NO, then the method delays allowing the remote unit to transmit until the next inhibit state bit has been received, as represented in block (418), and then returns via return path (407) to begin the four step decision process again.

Various other delays may be utilized that ensure that any existing ACK interval has finished before another transmission is allowed. These delays may be of a predetermined or random length.

Figure 5:
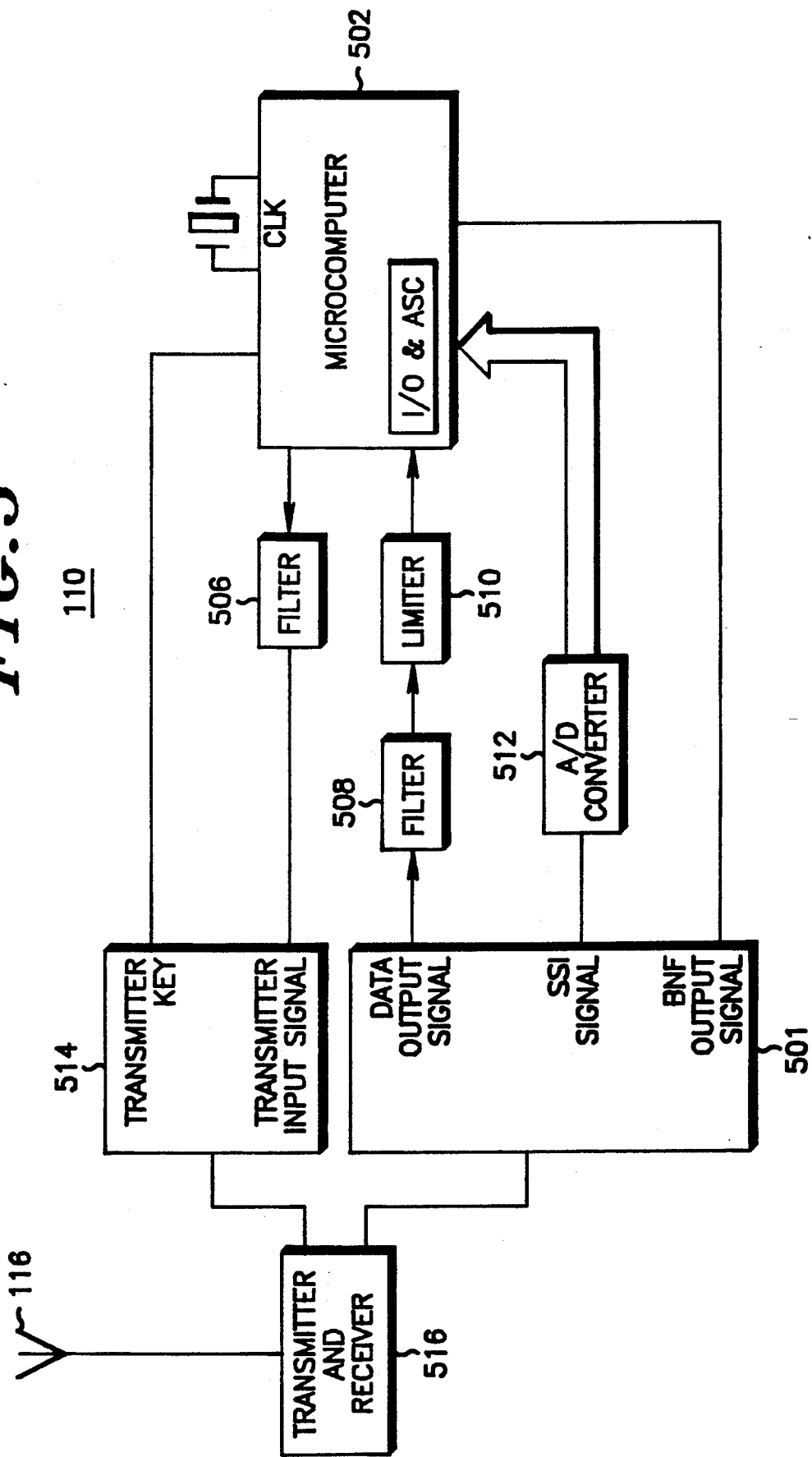
FIG. 5 is an expanded block diagram of the remote units depicted in FIG. 1.

Finally, FIG. 5 depicts an expanded block diagram of a typical remote unit, such as remote unit (110). As shown, it includes a receiver (501), a microcomputer (502) and various interface ports for handling input and output data signals. Included are transmitter filter (506), receiver filter (508) and limiter (510), and an A/D (analog-to-digital) converter (512). A transmitter key control line is also shown coupled to an included transmitter (514), which couples to a transmit-receive switch (516) which couples to an included antenna (116) as well as to the receiver (501).

In summary, a method and means for controlling transmissions among a plurality of communication units has been described that determines an inhibit state based upon an inhibit signal and information in the header before transmitting. This inhibit state prevents all of the other remote units from transmitting while a prescribed remote unit transmits a message or an acknowledgment (ACK) so that collisions between messages and ACKs, or between one ACK and another, are avoided. Message-message collisions are substantially reduced since the method causes a remote unit to utilize a random delay before attempting a retry to send the message a second time. Accordingly, other uses and modifications will be obvious to one skilled in art without departing from the scope of the present invention.

We claim:

1. In an RF communications system having at least one centrally located base site communicating with a plurality of remote site units, a method utilized by each of said remote units, comprising the steps of:
   (a) receiving a first transmission, addressed to a particular remote unit, comprising at least a header, separate coded message and an inhibit signal, said addressed unit thereupon being required to respond back with an ackowledgement signal; and
   (b) each of said remote units in the system, individually, and based upon said inhibit signal and the information in said header, determining an inhibit state effective for the entire communications system, wherein all remote units except those successfully addressed and waiting to send back an acknowledgement signal, are duly prevented from transiting during a time period, extending beyond the end of said transmitted coded message, sufficient to enable such required acknowledgment back.

2. The method according to claim 1, wherein step (a) includes receiving said first transmission on a first channel.

3. The method according to claim 1, wherein step (a) includes receiving an outbound transmission as said first transmission.

4. The method according to claim 1, wherein step (a) includes said inhibit signal imbedded within said first transmission.

5. The method according to claim 1, wherein step (b) includes determining an inhibit state before transmitting on a second channel.

6. The method according to claim 1, wherein said step (b) includes determining an inhibit state before transmitting an inbound transmission.

7. In an RF communications system having at least one base station transmitting on an outbound channel and a plurality of remote units that transmit to said base station on an inbound channel, a method utilized by said remote units, comprising the steps of:
 (a) receiving on the outbound channel an outbound transmission having an embedded inhibit signal and, further, at least a header and a coded message, at least some of said outbound messages requiring an acknowledgement back of a predetermined duration on said inbound channel by a called unit; and
 (b) each of said remote units in the system, individually, and based upon said inhibit signal and the information in said header, determining an inhibit state effective for the entire communications system, wherein all such remote units except those called and waiting to send back an ACK, are duly prevented from transmitting during a time period, extending beyond the end of said coded message, sufficient to enable the necessary ACK backs when the same is required.

8. The method according to claim 7, wherein step (a) includes receiving a header that includes at least one remote unit address.

9. The method according to claim 7, wherein step (a) includes receiving a header that includes information as to a coded message's length.

10. The method according to claim 7, wherein step (a) includes receiving a coded message at a prescribed remote unit, said coded message being decoded only when said coded message in said outbound transmission is intended for said prescribed remote unit.

11. The method according to claim 7, wherein step (a) comprises receiving an outbound transmission that includes a plurality of headers and coded messages arranged in sequence, said outbound transmission including an imbedded inhibit signal, and said outbound transmission requiring an ACK on said inbound channel for at least some of said plurality of sequential coded messages.

12. The method according to claim 7, wherein said ACK comprises a positive acknowledgment.

13. The method according to claim 7, wherein said ACK comprises a negative acknowledgment.

14. The method according to claim 13, wherein said negative acknowledgment includes an indication that said header has been properly received, but said coded message cannot be handled at this time.

15. The method according to claim 13, wherein said negative acknowledgment includes an indication that said header and said coded message cannot be properly decoded at this time.

16. The method according to claim 7, wherein step (b) includes determining said inhibit state for said plurality of remote units, except for a prescribed remote unit, when said imbedded inhibit signal indicates that there is no inbound transmission to said base station, so as to reserve a time slot for said ACK to be transmitted by said prescribed remote unit at the end of said outbound transmission.

17. The method according to claim 7, wherein step (b) includes determining said inhibit state for substantially all of said plurality of remote units, including a prescribed remote unit, when said imbedded inhibit signal indicates that there is an inbound transmission currently in progress to said base station that has preceded an ACK by a predetermined amount of time, so as to reserve a time slot for said ACK to be transmitted by said prescribed remote unit at the end of said inbound transmission.

18. The method according to claim 7, wherein step (b) includes determining said inhibit state for said plurality of remote units, except for a prescribed first remote unit and a second remote unit, when said imbedded inhibit signal indicates that there is an inbound transmission to said base station, said prescribed first unit having decoded a first message in said outbound transmission and awaiting a time slot to ACK, and said second remote unit having decoded a subsequent message in said outbound transmission from said base station awaiting a time slot to ACK, so as to reserve a stack interval at the end of said inbound transmission to said base station, said stack interval allowing at least a time slot for an ACK from said second remote unit and an adjacent time slot for an ACK from said first remote unit.

19. The method according to claim 7, wherein said imbedded inhibit signal, when activated, indicates that there is an inbound transmission currently in progress to said base station that prohibits transmission on said inbound channel.

20. The method according to claim 7, wherein said imbedded inhibit signal comprises at least some of a sequence of digital data bits imbedded in said outbound transmission.

21. The method according to claim 20, wherein said digital data bits comprise at least three bits, and wherein:
 a) all digital ones, indicating inbound channel activity, so as to prohibit a concurrent transmission on said inbound channel;
 b) all digital zeroes, indicating inbound channel inactivity, so as to permit a transmission on said inbound channel; and
 c) any mixture of digital ones and zeroes, indicating an indefinite state of inbound channel activity, so as to delay a transmission until a new set of at least three digital data bits are received.

22. The method according to claim 7, wherein step (b) includes determining that said inhibit signal is activated and extending said activated inhibit state for a fixed time interval to include at least one time slot for an ACK after said imbedded inhibit signal indicates that there is no longer an inbound transmission to said base station.

23. The method according to claim 7 further comprising the step of:
 c) transmitting on said inbound channel when said inbound channel has no ACKS in progress, has no inbound message in progress, and has no inbound message currently in progress which has preceded at least one required ACK that is anticipated to be transmitted on said inbound channel, so as to ensure that said inbound channel is clear or is anticipated to be clear, thereby avoiding collisions of inbound transmissions from at least 2 remote units.

24. The method according to claim 7, wherein step (a) further includes:
   a1) sensing whether said base station is transmitting on said outbound channel, and when it is not, allowing an inbound transmission on said inbound channel.

25. In a RF communications system having at least one base station and a plurality of remote units that transmit to said base station on an inbound channel, a method utilized by said remote units, comprising the steps of:
   (a) sensing whether said base station is transmitting on an outbound channel and, when said base station is not transmitting, proceeding to step (d); otherwise,
   (b) receiving an outbound transmission having an imbedded inhibit signal therein and, further, at least a header and a coded message, at least some of said outbound messages requiring an acknowledgement (ACK) back of a predetermined duration on said inbound channel;
   (c) each of said remote units in the system, individually, and based upon said inhibit signal and the information in said header, determining an inhibit state effective for the entire communications system, wherein all such remote units except those successfully called and waiting to send back an ACK, are duly prevented from transmitting during a time period, extending beyond the end of said coded message, sufficient to enable the necessary ACK backs when the same is required, and proceeding to step (d) when a set of permissible conditions exist, otherwise delaying and not transmitting; and
   (d) allowing an inbound transmission to said base station on said inbound channel.

26. The method according to claim 25, wherein said set of permissible conditions in step (c) includes:
   a) when said inbound channel has no ACKs currently in progress;
   b) when said inbound channel has no inbound messages currently in progress;
   c) when said inbound channel has no ACK soon to be transmitted; and
   d) when said inbound channel has no inbound message just completed which has preceded at least one required ACK that is anticipated to be transmitted on said inbound channel.

27. The method according to claim 26, wherein said permissible conditions are determined based upon at least the following criteria:
   a) said inhibit signal and information in said header;
   b) said inhibit signal;
   c) said information in said header; and
   d) said inhibit signal and information in said header.

28. Remote unit apparatus for use in an RF communications system that includes at least one base stat station having an outbound channel and an inbound channel, the apparatus comprising;
   (a) means for receiving an outbound transmission including an imbedded inhibit signal therein and, further, at least a header and a coded message addressed to at least a prescribed one of a plurality of remote units, said coded message requiring an acknowledgement (ACK) back of a predetermined duration on said inbound channel by said prescribed remote unit so addressed:
   (b) means in each of said remote units for determining, based on said inhibit signal and the information in said header, an inhibit state effective for the entire communications system, wherein all such remote units except those successfully addressed and waiting to send an ACK back, are duly prevented from transmitting during a time period, extending beyond the end of the coded message, sufficient to enable any and all necessary ACK backs by called remote units, and means for determining that a set of permissible conditions exist, otherwise delaying transmission; and
   (c) means for transmitting an inbound transmission on said inbound channel.

29. The apparatus according to claim 28 wherein said set of permissible conditions includes:
   a) when said inbound channel has no ACKs currently in progress;
   b) when said inbound channel has no inbound messages currently in progress;
   c) when said inbound channel has no ACK soon to be transmitted; and
   d) when said inbound channel has no inbound message just completed which has proceeded at least one required ACK that is anticipated to be transmitted on said inbound channel.

30. The apparatus according to claim 21, wherein said means for transmitting transmits only when said means for determining indicates that said inbound channel has no ACKs in progress, has no inbound messages currently in progress, has no ACK soon to be transmitted, and has no inbound message just completed which has preceded at least one required ACK that is anticipated to be transmitted on said inbound channel.

31. The method according to claim 29, wherein said means for receiving includes means for sensing whether said base station is transmitting.

32. The method according to claim 31, wherein said means for transmitting is allowed to transmit when said means for sensing indicates that said base station is not transmitting.

33. The method according to claim 31, wherein said means for determining includes means for checking whether an initial delay has been set to prohibit transmission for a prescribed delay duration.

* * * * *